United States Patent                                                             [11] 3,609,468

[72] Inventors  Yasukane Kihara
                Tokyo;
                Ushimatsu Moriyama, Fujisawa-shi; Yoichi
                Seta, Yokohama-shi, all of Japan
[21] Appl. No.  796,075
[22] Filed      Feb. 3, 1969
[45] Patented   Sept. 28, 1971
[73] Assignee   Tokyo Shibaure Electric Co., Ltd.
                Kawasaki-shi, Japan
[32] Priority   Feb. 5, 1968
[33]            Japan
[31]            43/6715

[54] PASTE COMPOSITION FOR AN ELECTROLYTIC
     CONDENSER AND ELECTROLYTIC CONDENSER
     CONTAINING SAME
     2 Claims, 4 Drawing Figs.
[52] U.S. Cl. .................................................... 317/230,
                                                              252/62.2
[51] Int. Cl. ...................................................... H01g 9/02
[50] Field of Search ........................................... 252/62.2;
                                                              317/230

[56]                    References Cited
                   UNITED STATES PATENTS
2,505,180   4/1950   Georgiev et al..............   252/62.2
3,067,367  12/1962   Ross..............................   252/62.2 X
3,302,071   1/1967   Stahr.............................   252/62.2 X
3,351,823  11/1967   Jenny...........................   262/62.2 X Primary Examiner—Tobias E. Levow
Assistant Examiner—J. Cooper
Attorney—Flynn and Frishauf ABSTRACT: A paste composition for an electrolytic condenser consisting of electrolyte compounds, ethylene glycol and polyvinyl pyrrolidone. When used as an electrolyte for an electrolytic condenser, the composition furnishes the condenser with good withstand voltage properties and stable electrical properties.

3,609,468

PASTE COMPOSITION FOR AN ELECTROLYTIC CONDENSER AND ELECTROLYTIC CONDENSER CONTAINING SAME

BACKGROUND OF THE INVENTION

The present invention relates to a paste composition used as an electrolyte for an electrolytic condenser.

A general paste composition for an electrolytic condenser consists of electrolyte compounds of organic or inorganic acids or salts thereof and solvents for dissolving said compounds. The typical known solvent is ethylene glycol. However, an electrolytic condenser using such paste as an electrolyte displays insufficient withstand voltage properties due to the low maximum formation voltage obtained by the paste, so that it is barred from use in a circuit impressed with an appreciably high voltage, for example, of 450 volts or higher.

SUMMARY OF THE INVENTION

It is accordingly an object of the present invention to provide a paste composition which, when used as an electrolyte for an electrolytic condenser, affords excellent electrical properties to the condenser.

Another object of the invention is to provide a paste composition for an electrolytic condenser capable of improving the withstand voltage strength of said condenser.

Generally, the paste composition of the present invention for an electrolytic condenser consists of electrolyte compounds, ethylene glycol and polyvinyl pyrrolidone. When used as an electrolyte for an electrolytic condenser, the composition has been shown to give the condenser excellent stability and withstand voltage properties.

DETAILED DESCRIPTION OF THE INVENTION

Figure 1:
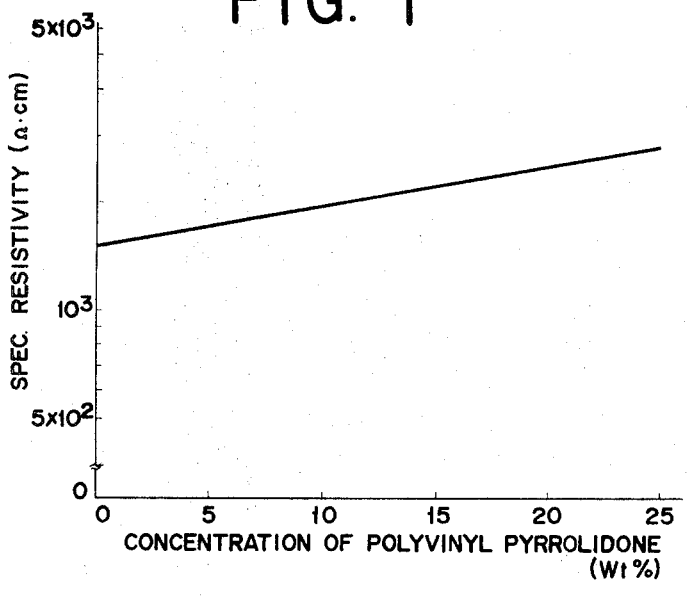
FIG. 1 is a graph showing the relationship of the proportions of polyvinyl pyrrolidone contained in the paste composition of the present invention for an electrolytic condenser versus the specific resistivity of said composition.

Electrolyte compounds used in preparing the paste composition of the present invention for an electrolytic condenser may consist of any one or combination of organic or inorganic acids or salts thereof. Acids capable of preferable use include anhydrous boric acid, benzoic acid, acetic acid, picric acid, salicylic acid, etc. Typical salts of these acids are ammonium benzoate, ammonium hydrogen succinate, trimethylammonium acetate, barium picrate, lithium maleate, zinc hydrogen citrate, magnesium phosphate, nickelous nitrate, etc. The paste composition of the present invention for an electrolytic condenser is formed by dissolving the above-listed electrolyte compounds in a mixture of ethylene glycol and polyvinyl pyrrolidone. As compared with the conventional paste composition, it has been found that when used in an electrolytic condenser, the present paste composition is capable of forming a better electrode and furnishes the condenser with greater capacity stability and higher withstand voltage properties when the condenser remains unloaded. It is not clear by what mechanism the polyvinyl pyrrolidone included in the paste composition of the present invention can improve the aforesaid properties thereof. From the fact, however, that the composition containing the polyvinyl pyrrolidone displays a remarkable increase in a maximum formation voltage over the one lacking said polyvinyl pyrrolidone, it is assumed that this material is conductive to the protection or regeneration of the formed surface of the anode of an electrolytic condenser brought in contact with the composition containing said material. The larger the content of polyvinyl pyrrolidone in the paste composition, the more prominent will become the aforementioned effect. While the increased amounts of the polyvinyl pyrrolidone tend to increase the specific resistivity of the composition, such increase of the resistivity is not great enough substantially to vary the electrical properties of the condenser. Accordingly, this will not constitute a factor in limiting the proportions of polyvinyl pyrrolidone to be added. It may be generalized that the presence of 4 to 35 percent by weight of polyvinyl pyrrolidone on the basis of the entire composition offers the best electrical and physical properties.

The present invention will be more fully appreciated from the following specific examples.

Example 1

There were prepared in accordance with the recipe shown in the table four different samples of a paste composition according to the present invention and four different reference samples representing a paste composition outside of the scope of the invention.

|  | Samples of the present invention | | | | Reference samples | | | |
|---|---|---|---|---|---|---|---|---|
|  | 1 | 2 | 3 | 4 | 1 | 2 | 3 | 4 |
| Anhydrous boric acid (wt. percent) | 0.5 | 1.5 | 5.0 | 10.0 | 0.5 | 1.5 | 5.0 | 10.0 |
| Ammonium benzoate (wt. percent) | 0.8 | 2.5 | 10.0 | 15.0 | 0.8 | 2.5 | 10.0 | 15.0 |
| Ethylene glycol (wt. percent) | 67.7 | 71.0 | 65.0 | 71.0 | 98.7 | 96.0 | 85.0 | 75.0 |
| Polyvinyl pyrrolidone (wt. percent) | 31.0 | 25.0 | 20.0 | 4.0 |  |  |  |  |
| Breakdown voltage (v.) | 540 | 575 | 575 | 495 | 80 | 225 | 275 | 310 |

The breakdown voltages given in the table above are values determined by immersing in 50 ml. each of the four samples of the present paste composition and the four reference samples of the other paste composition three aluminum foils 99.99 percent pure, 100 microns thick and 10 cm$^2$. in area at a space of 15 mm. in parallel relationship which had been washed with water, degreased, cleaned with alcohol and allowed to dry, and thereafter carrying out constant current formation at a current density of 100 m./dm.$^2$ with the central foil used as an anode and the foils on both sides thereof as a cathode. Further there were prepared eight different electrolytic condensers in the order of the following steps, using the aforementioned present and reference samples as an electrolyte. The anode of the condenser consisted of an aluminum foil 98 microns thick, 50 mm. × 950 mm. in size, 99.99 percent pure and having a static capacity of 7.9 micro $\mu$f./dm.$^2$ which, after etching treatment, was formed at constant current in an aqueous solution of ammonium borate until 550 volts were reached. The cathode was formed of another aluminum foil 30 microns thick, 50 ×1000 mm. in size and 99.99 percent pure. The anode, cathode and an intermediate layer consisting of a sheet of high-density kraft paper 20 microns thick and a sheet of medium-density kraft paper 20 microns thick were rolled together into a cylindrical form. The cylindrical body dried 1 hour at a pressure of 1 mm. Hg. and a temperature of 80° C. was immersed in the electrolyte 3 hours at a pressure of 20 mm. Hg. and a temperature of 60 °C. so as to cause the porous surface of the anode and intermediate layer of the cylindrical body to be impregnated with the electrolyte. After impregnation, the anode and cathode of the cylindrical body were fitted with a terminal, and around the cylindrical body there was wound kraft paper for insulation. Then the cylindrical body was enclosed in a cylindrical aluminum envelope which was closed at one end and had an insulation layer of pitch formed on the inner wall of said closed end portion. The open end of the cylindrical envelope was encapped with a laminate of rubber and synthetic resin in such a manner that the aforementioned terminals projected outside.

The eight different condensers thus prepared were subjected to constant current formation at a current density of 5 m./dm.$^2$, using a galvanostat. The condensers using the samples 2 and 3 of the present invention did not display any abnormality when the formation voltage reached 540 v., whereas the condenser formed of the reference sample 2 was prominently delayed in voltage riser after the formation voltage stood at 190 v., and started spark discharges when said voltage increased to 225 v. The condenser involving the reference sample 3 was extremely retarded in voltage rise after the formation voltage amounted to about 230 v., and was observed to present spark discharges when said voltage rose to 275 v.

Further determination was made of several other electrical properties of the condensers prepared from the aforesaid samples 2 and 3 of the present invention. The results are presented in the table below.

|  | Static capacity of 120 c./s. (µf.) | Decreased capacity based on theoretic value (percent) | Dielectric loss (percent) | Leakage current at 500 v. (µa.) |
|---|---|---|---|---|
| Condenser using sample 2 of the present invention | 59 | 21.3 | 0.03 | 3.2 |
| Condenser using sample 3 of the present invention | 61 | 18.7 | 0.03 | 3.8 |

Example 2

There were prepared in accordance with the recipe given in the table below four different samples of a paste composition according to the present invention and one reference sample representing a paste composition outside of the scope of the invention.

|  | Samples of the present invention | | | | Reference samples |
|---|---|---|---|---|---|
|  | 5 | 6 | 7 | 8 | 5 |
| Anhydrous boric acid (wt. percent) | 1.5 | 1.5 | 1.5 | 1.5 | 1.5 |
| Ammonium benzoate (wt. percent) | 2.5 | 2.5 | 2.5 | 2.5 | 2.5 |
| Ethylene glycol (wt. percent) | 91 | 86 | 81 | 71 | 96 |
| Polyvinyl pyrrolidone (wt. percent) | 5 | 10 | 15 | 25 |  |

Figure 2:
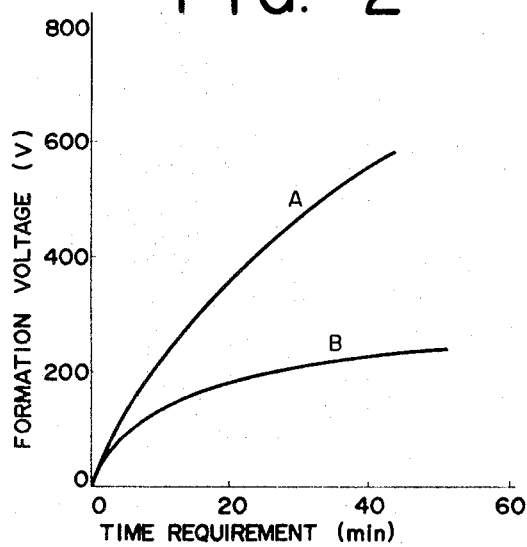
FIG. 2 is a graph indicating changes with time in the voltage in constant voltage formation as compared between the paste composition of the invention and that of the prior art.

Determination was made of the specific resistivity of the samples 5 to 8. The relationship of these values and the proportions of polyvinyl pyrrolidone contained is given in FIG. 1. The sample 8 of the present invention and the reference sample 5 were subjected to constant current formation under the same conditions as in Example 1 and determination was made of changes with time in formation voltage. The results are presented in Fig. 2. In this figure, the curve A represents the present sample 8 and the curve B the reference sample 5.

Figure 3:
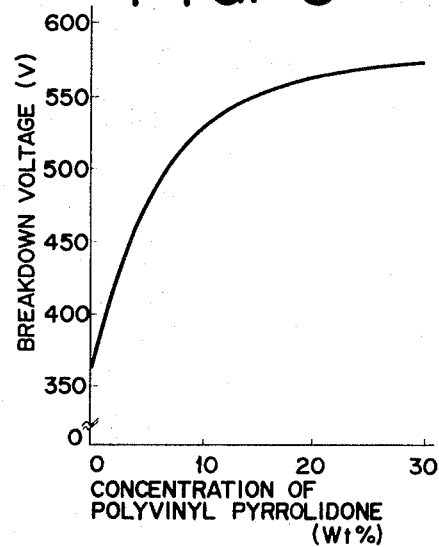
FIG. 3 is a graph representing the relationship of the proportions of polyvinyl pyrrolidone contained in the paste composition of the invention versus a breakdown voltage obtained.

Fig. 3 presents the relationship of the proportions of polyvinyl pyrrolidone contained in the present samples 5 to 8 and the maximum voltages attained. As apparent from the figure, the increased content of polyvinyl pyrrolidone is conducive to the rise of a maximum formation voltage.

Example 3

Figure 4:
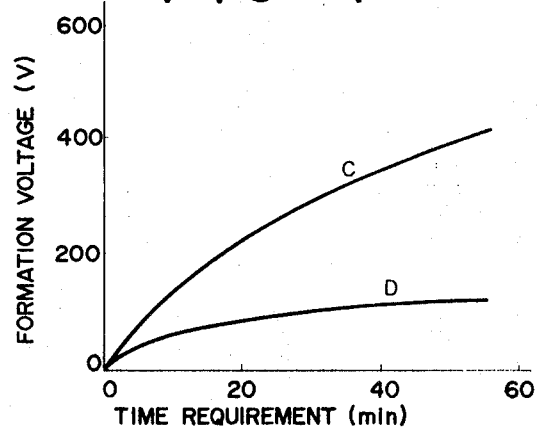
FIG. 4 is a graph denoting changes with time in the voltage in constant current formation as compared between the paste composition according to another embodiment of the invention and that of the prior art.

There were mixed at normal temperature 2.45 parts by weight of benzoic acid, 2.80 parts by weight of ammonium benzoate, 69.75 parts by weight of ethylene glycol and 25.0 parts by weight of polyvinyl pyrrolidone. The sample 9 of the present invention thus prepared had a pH of 5.70. By way of comparison there was formed a reference sample 9 from 2.45 parts by weight of benzoic acid, 2.80 parts by weight of ammonium benzoate and 91.75 parts by weight of ethylene glycol. The present sample 9 and reference sample 9 displayed a specific resistivity of 2860 and 2450 Ω·cm. respectively. These two sample paste compositions were formed at constant current under the same conditions as in example 1, and their formation voltage was determined with the results as shown in Fig. 4. In this figure the curve C denotes the present sample 9 and the curve D the reference sample 9.

Example 4

There were prepared in accordance with the recipe given in the table below four different samples of a paste composition according to the present invention and four different reference samples of a paste composition outside of the scope of the invention. The present and reference samples were subjected to constant current formation under the same conditions as in example 1. The results of determining the breakdown voltage of each sample are also presented in the table below.

|  | Samples of the present invention | | | | Reference samples | | | |
|---|---|---|---|---|---|---|---|---|
|  | 10 | 11 | 12 | 13 | 10 | 11 | 12 | 13 |
| Benzoic acid (wt. percent) | 1.2 | 2.45 | 5.0 | 12.5 | 1.2 | 2.45 | 5.0 | 12.5 |
| Ammonium benzoate (wt. percent) | 1.5 | 2.8 | 5.0 | 10.5 | 1.5 | 2.8 | 5.0 | 10.5 |
| Ethylene glycol (wt. percent) | 66.3 | 69.75 | 72.0 | 73.0 | 97.3 | 94.75 | 90.0 | 77.0 |
| Polyvinyl pyrrolidone (wt. percent) | 31.0 | 25.0 | 18.0 | 4.0 |  |  |  |  |
| Breakdown voltage (v.) | 515 | 510 | 560 | 475 | 120 | 130 | 150 | 185 |

Example 5

There were prepared in accordance with the recipe shown in the table below seven different samples of a paste composition according to the present invention and seven different reference samples representing a paste composition outside of the scope of the invention. Each of the present and reference samples was subjected to constant current formation under the same conditions as in Example 1. The breakdown voltage of these samples is also given in the table below.

|  | Samples of the present invention | | | | | | |
|---|---|---|---|---|---|---|---|
|  | 1 | 2 | 3 | 4 | 5 | 6 | 7 |
| Electrolyte compounds (wt. percent): |  |  |  |  |  |  |  |
| Ammonium hydrogen succinate | 12.0 |  |  |  |  |  |  |
| Acetic acid |  |  |  |  | 4.2 |  |  |
| Trimethylammonium acetate |  |  |  | 1.2 |  |  |  |
| Picric acid |  | 2.0 |  |  |  |  |  |
| Barium picrate | 18.0 |  |  |  |  |  |  |
| Salicylic acid |  |  |  | 2.4 |  |  |  |
| Lithium oleate |  |  |  | 2.4 |  |  |  |
| Zinc hydrogen citrate |  |  |  |  |  | 1.25 |  |
| Magnesium phenyl-phosphate |  |  |  |  |  |  | 0.85 |
| Nickelous nitrate |  |  | 7.6 |  |  |  |  |
| Ethylene glycol | 76.0 | 82.0 | 84.0 | 81.0 | 76.0 | 74.75 | 69.15 |
| Polyvinyl pyrrolidone | 4.0 | 6.0 | 8.4 | 14.2 | 18.6 | 24.0 | 30.0 |
| Breakdown voltage (v.) | 425 | 435 | 460 | 540 | 460 | 570 | 500 |

Table—Continued

| Electrolyte compounds (wt. percent): | Reference samples | | | | | | |
|---|---|---|---|---|---|---|---|
| Ammonium hydrogen succinate | 12.0 | | | | | | |
| Acetic acid | | | | 4.2 | | | |
| Trimethylammonium acetate | | | | | 1.2 | | |
| Picric acid | 2.0 | | | | | | |
| Barium picrate | | 18.0 | | | | | |
| Salicylic acid | | | 2.4 | | | | |
| Lithium maleate | | | 2.4 | | | | |
| Zinc hydrogen citrate | | | | | 1.25 | | |
| Magnesium phenyl-phosphate | | | | | | 0.85 | |
| Nickelous nitrate | | | | | | | 7.6 |
| Ethylene glycol | 80.0 | 88.0 | 84.0 | 95.2 | 94.6 | 98.75 | 99.15 |
| Polyvinyl pyrrolidone | | | | | | | |
| Breakdown voltage (v.) | 160 | 200 | 105 | 120 | 115 | 95 | 85 |

As clearly seen from the data of the aforementioned examples, the paste composition of the present invention containing polyvinyl pyrrolidone displays a prominent increase in its breakdown voltage over that lacking said polyvinyl pyrrolidone, regardless of the kind and proportions of the electrolyte compound involved. This means that are electrolytic condenser prepared from this paste composition is also improved in withstand voltage properties.

What is claimed is:

1. In a paste composition for an electrolytic condenser, said composition consisting essentially of ethylene glycol, and at least one compound selected from the group consisting of anhydrous boric acid, benzoic acid, acetic acid, picric acid, salicylic acid, ammonium benzoate, ammonium hydrogen succinate, trimethylammonium acetate, barium picrate, lithium maleate, zinc hydrogen citrate, magnesium phenyl phosphate and nickelous nitrate, the improvement comprising the presence of from about 4 to about 35 percent by weight of polyvinyl pyrrolidone in said composition.

2. In an electrolytic condenser containing a pair of aluminum foils electrodes, a porous layer interposed between said electrodes and a paste composition impregnated in said porous layer, a terminal fitted to each of the respective electrodes and an envelope housing the electrodes, porous layer and paste composition, the improvement wherein said paste composition consists essentially of the composition of claim 1.

UNITED STATES PATENT OFFICE
CERTIFICATE OF CORRECTION

Patent No. 3,609,468                    Dated September 28, 1971

Inventor(s) YASUKANE KIHARA et al

It is certified that error appears in the above-identified patent and that said Letters Patent are hereby corrected as shown below:

The Assignee is Tokyo Shibaura Electric Co., Ltd.

Column 2, line 48 - "100 m/dm$^2$" should be "100 mA/dm$^2$".

Column 2, line 55 - "micro   f/dm$^2$" should be "micro F/dm$^2$".

Column 3, line 6 - "m./dm$^2$" should be mA/dm$^2$".

Column 3, line 10 - "riser" should be "rise".

Signed and sealed this 10th day of October 1972.

(SEAL)
Attest:

EDWARD M.FLETCHER,JR.                ROBERT GOTTSCHALK
Attesting Officer                    Commissioner of Patents